United States Patent
Wong et al.

(10) Patent No.: US 7,159,194 B2
(45) Date of Patent: Jan. 2, 2007

(54) ORIENTATION DEPENDENT FUNCTIONALITY OF AN ELECTRONIC DEVICE

(75) Inventors: Yoon Kean Wong, Menlo Park, CA (US); William Robert Hanson, Mountain View, CA (US); Shawn R. Gettemy, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 591 days.

(21) Appl. No.: 10/006,525

(22) Filed: Nov. 30, 2001

(65) Prior Publication Data

US 2003/0103091 A1 Jun. 5, 2003

(51) Int. Cl.
*G06F 17/00* (2006.01)

(52) U.S. Cl. .................. 715/863; 715/864; 715/700; 715/866; 345/1.3

(58) Field of Classification Search ............. 345/863, 345/864, 866, 206, 699, 1.1, 1.2, 1.3, 173; 455/556, 557; 715/863, 864, 700, 866
See application file for complete search history.

(56) References Cited

U.S. PATENT DOCUMENTS

| | | | |
|---|---|---|---|
| 5,283,862 A * | 2/1994 | Lund .......................... 345/173 |
| 5,536,930 A * | 7/1996 | Barkan et al. ......... 235/472.01 |
| 5,703,623 A * | 12/1997 | Hall et al. ................... 345/158 |
| 5,758,267 A * | 5/1998 | Pinder et al. ............... 455/90.2 |
| 6,047,196 A * | 4/2000 | Makela et al. ........... 455/556.1 |
| 6,342,830 B1 * | 1/2002 | Want et al. ................. 340/10.1 |
| 6,389,267 B1 * | 5/2002 | Imai .......................... 455/90.1 |
| 6,418,325 B1 * | 7/2002 | Reber et al. ............. 455/556.1 |
| 6,453,173 B1 * | 9/2002 | Reber et al. ................. 455/557 |
| 6,473,883 B1 * | 10/2002 | Bobba et al. .................. 716/2 |
| 6,492,974 B1 * | 12/2002 | Nobuchi et al. ............ 345/156 |
| 6,704,007 B1 * | 3/2004 | Clapper ...................... 345/204 |
| 2002/0028696 A1 * | 3/2002 | Hirayama et al. .......... 455/556 |
| 2002/0044425 A1 * | 4/2002 | Ijas et al. .................... 361/724 |
| 2003/0038779 A1 * | 2/2003 | Baron et al. ................. 345/157 |
| 2003/0044000 A1 * | 3/2003 | Kfoury et al. ......... 379/433.04 |

* cited by examiner

*Primary Examiner*—Tadesse Hailu
(74) *Attorney, Agent, or Firm*—Shemwell Mahamedi, LLP

(57) ABSTRACT

An electronic device is provided that includes a housing, a plurality of modules, a sensor and a selection mechanism. The housing has multiple housing segments, with each segment housing one of the plurality of modules. The sensor detects an orientation of the electronic device. The selection mechanism automatically selects at least one, but nor all, of the plurality of modules to be active, based on the detected orientation of the electronic device.

26 Claims, 7 Drawing Sheets

ORIENTATION DEPENDENT FUNCTIONALITY OF AN ELECTRONIC DEVICE

FIELD OF THE INVENTION

The present invention relates to electronic devices. In particular, the present invention relates to an electronic device having functionality dependent on its orientation.

BACKGROUND OF THE INVENTION

Portable electronics devices tend to combine functionality with small size. But in order to add functionality, portable electronic devices tend to have to sacrifice compactness. Additional functionality typically requires additional user-interface features. A housing for an electronic device has to be sufficient in size in order to provide for the additional user-interface features. The housing may also have to be sufficient to provide for additional internal components needed for the added functionality.

Devices that combine to distinct functions are usually larger or more bulky than devices that provide the same functions individually. For example, hybrid devices exist that are both personal digital assistants (PDAs) and cellular phones. These devices tend to be larger than devices that are only cellular phones or PDAs. Part of the reason why hybrid devices are larger is that the device's PDA functionality require it to be large enough to provide user-interface features that include a contact-sensitive display, a set of buttons and a stylus. The cellular phone functionality requires sufficient housing space to support a numeric keypad, and an antenna. The user-interface features of the PDA and cellular phone functions do not overlap. Consequently, the housing has to be large enough to provide both.

SUMMARY OF THE INVENTION

According to an embodiment of the invention, an electronic device is formed from at least two modules. Each module has a distinct functionality, and includes a set of user-interface features that are suited for that module's functionality. The electronic device may have separate exterior panels. Each exterior panel provides the set of user-interface features for one of the two modules. The electronic device may be operated so that only one module, or its set of user-interface features, is active. The other module(s), or their respective sets of user-interface features, or maintained or made inactive.

The selection as to which module is operable is made automatically by components of the electronic device, based on a detected orientation of the electronic device. In one embodiment, the module or set of user-interface features facing the user (or upward facing) is selected to be operable.

Other embodiments of the invention include an electronic device having two or more sets of user-interface features. Each user-interface feature may be located on a different exterior panel. One user-interface feature may be selected over another user-interface feature based on a detected orientation of the electronic device.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

DETAILED DESCRIPTION OF THE INVENTION

Figure 1A:
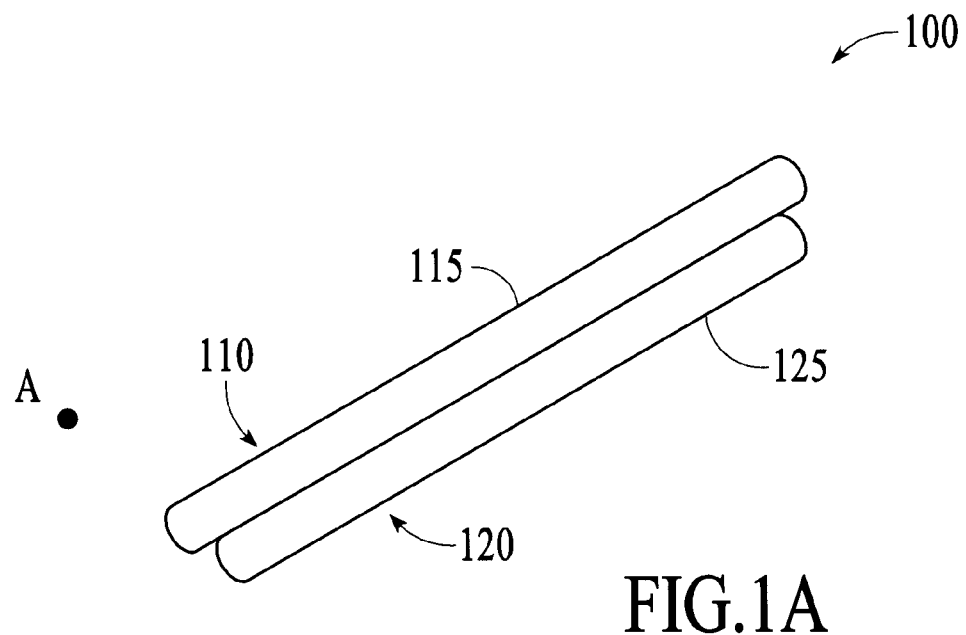
FIG. 1A is a side view of an electronic device in a first state, under an embodiment of the invention.

Embodiments of the invention describe an electronic device having orientation dependent functionality. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

In an embodiment, an electronic device includes a housing, a plurality of modules, a sensor, and a selection mechanism. The housing has a plurality of housing segments, with each housing segment having one of the modules. The sensor detects an orientation of the electronic device. The selection mechanism automatically selects at least one, but not all, of the plurality of modules to be active. The selection is based on the detected orientation of the electronic device.

As used herein, the term "module" means a component having a combination of logic and one or more user-interface features. Modules may differ in design, configuration and function. Examples of modules include components that can be operated as personal digital assistants (PDAs), mobile phones, portable global positioning systems, calculators, modems, digital cameras and other devices.

In one embodiment, the sensor detects which one of the modules is oriented downward, or conversely, which one of the modules is directed upward. The terms "downward" and "upward" is intended to be relative to a gravitational force.

In an embodiment, each module contains a different set of user-interface features. As used herein, the term "user-interface feature" includes any component that provides output to a user, and/or enables users to enter input. Examples of user-interface features include displays, touch-sensitive displays, extended digitizers, buttons and contact-sensitive sensors. Digital user-interface features are input components that appear to operate in conjunction with a display. Examples of digital user-interface features include icons, menu items and electronic handwriting recognizers. Other examples of user-interface features include speakers and microphones.

As used herein, the term "inactive" means a state where user-interface features are not actuatable. An inactive state may correspond to a low-power state, such as a sleep-mode, where the device has to be actuated to be fully operational.

B. Electronic Device Orientation

Embodiments of the invention include an electronic device having multiple modules that are selectively operational based on an orientation of the electronic device. According to one embodiment, the electronic device has two modules, and two identifiable orientations. A sensor or other mechanism detects the electronic device as being in one of the two orientations. Components of the electronic device automatically activate one of the two modules based on the detected orientation.

For example, the electronic device can be oriented so that one of the modules is detected to be upward relative to gravity, and the other is detected to be downward. The module detected to be upward is either automatically activated, or maintained in an active state. Concurrently, the module detected to be downward is either automatically deactivated, or maintained in an inactive state. In this way, only one of the two modules is active, and that module is upward facing.

The particular manner in which the orientation is determined can vary with other embodiments. For example, the downward facing module may correspond to the module that is selected to be operational. Other embodiments may provide for the orientation to be determined from the proximity of the electronic device to another device, person or reference point. This proximity may determine which module of the electronic device is to be active.

In addition, multiple modules may be provided. In one embodiment, one detectable orientation exists for each module. Other embodiments provide for multiple modules to be active based on one detected orientation. For example, the electronic device may be a cube. Each face of the cube may have a set of user-interface features. A detected orientation of the electronic device may correspond to a face of the cube being in a position, such as upward facing. The set of user-interface features for that face are active, but the set of user-interface features for the other faces are inactive.

FIG. 1A is a side view of an electronic device 100 in a first state, under an embodiment of the invention. The electronic device 100 includes a first module 110 joined to a second module 120. Only one of the modules 110, 120 is selected to be active, depending on the orientation detected for the electronic device. The first module 110 has a first housing segment 115. The second module 120 has a second housing segment 125. The first and second modules 110, 120 combine to form one housing.

Figure 2A:
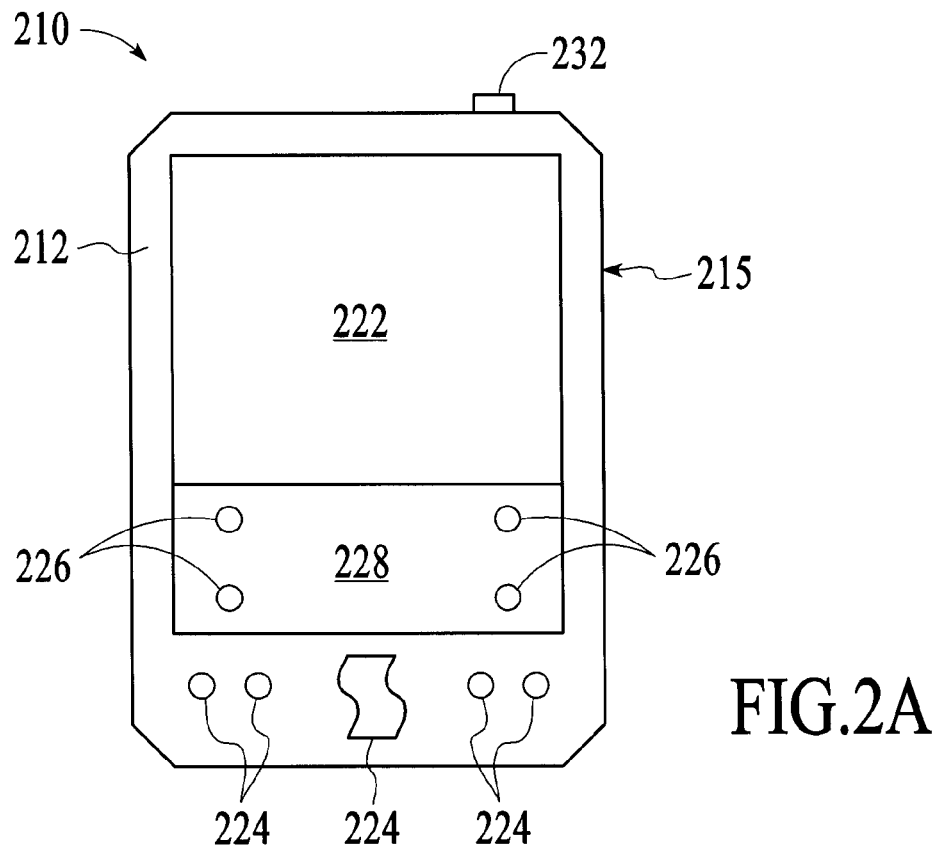
FIG. 2A is a front view of a first module of an electronic device, under an embodiment of the invention.
Figure 2B:
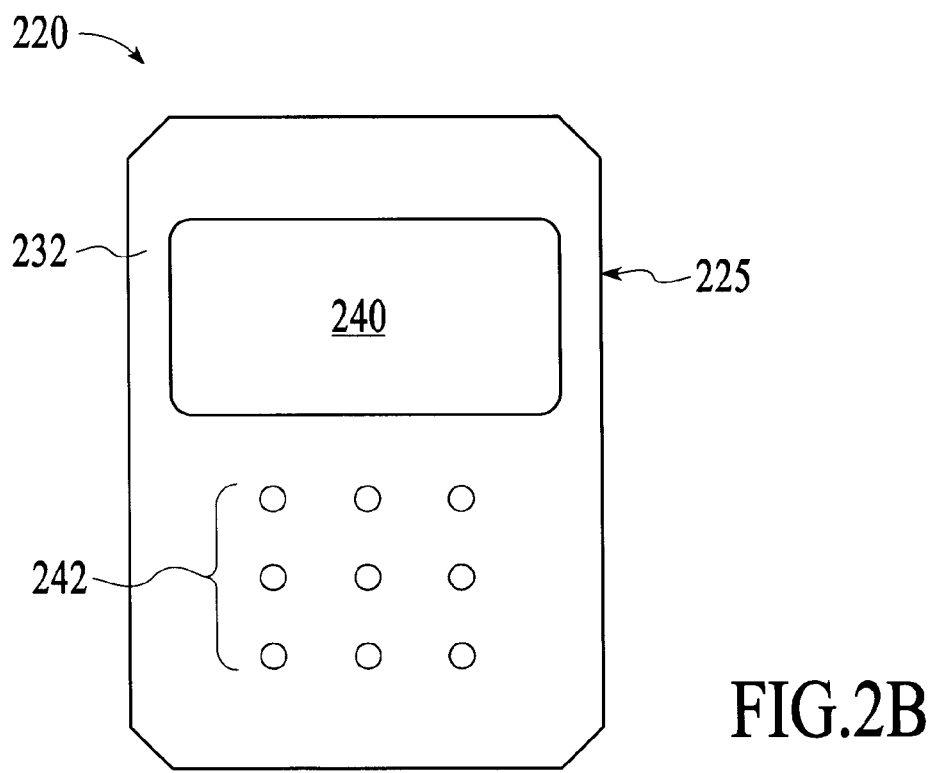
FIG. 2B is a front view of a second module of an electronic device, under an embodiment of the invention.

In an embodiment, each module 110, 120 performs a different function. Accordingly, each module has a different set of user-interface features. FIGS. 2A and 2B provide examples of the different functions that can be performed with modules of electronic device 100.

Point A represents a reference point from where a user would access the upward facing module. In such an embodiment, the upward facing module is designated as being active or operational based on the assumption that the user will want to operate the upward facing module. The downward facing module is designated to be inactive.

In a first state, the identified orientation of the electronic device 100 is that the first module 110 is upward facing, and the second module 120 downward facing. Therefore, the first module 110 is active or operational, and the second module 120 is inactive. Alternatively, in the first state, a set of user-interface features for first module 110 is operational, and a set of user-interface features for second module 120 is non-operational.

Figure 1B:
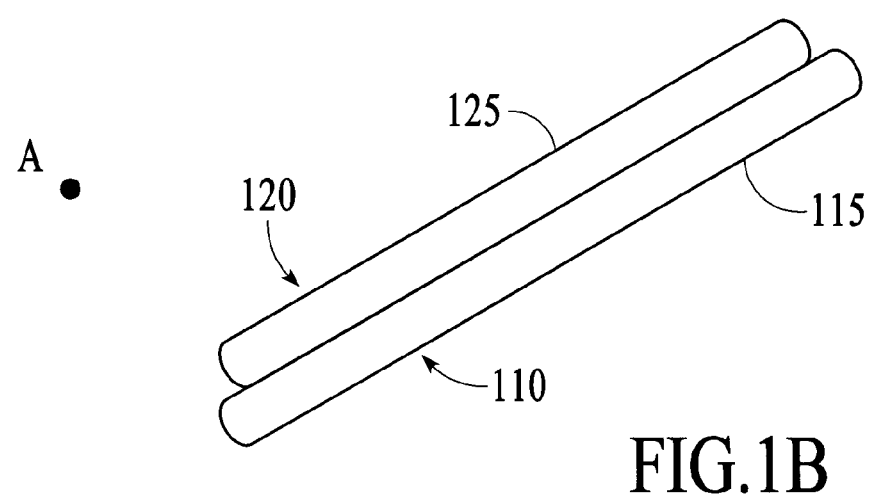
FIG. 1B is a side view of an electronic device in a second state, under an embodiment of the invention.

FIG. 1B illustrates electronic device 100 in a second state. In a second state, the orientation of the electronic device 100 is that second module 120 is upward facing, and first module 110 is downward facing. As such, second module 120, and/or its set of user-interface features are active or operational. The first module 110, and/or its set of user-interface features, is inactive or non-operational.

Several advantages are present when one of the modules is active and the other is inactive. Battery and processing resources of the electronic device 100 are conserved. Furthermore, the active module may be operated without affect from the inactive module. For example, in the first state, a user may grip electronic device 100 to use first module 110. The grip may cause buttons or other features of second module 120 to be pressed. However, since the second module 120 is inactive, the inadvertent button presses on the second module 120 do not interfere with the active use of the first module 110.

If the electronic device transitions from the first state (FIG. 1A) to the second state (FIG. 1B), or from the second state to the first state, the active module will switch from being active or operational to being inactive and inoperational. For example, going from the first state to the second state, first module 110 may go from an operational and active mode to a sleep mode. Second module 120 goes from a sleep mode to an operational and active mode.

C. Modules for Electronic Device

FIG. 2A is a frontal view of a PDA module 210, under an embodiment of the invention. The PDA module 210 may be used to operate personal management software, including electronic calendars and address books. The PDA module 210 may correspond to one of the first or second modules 110, 120. Examples of devices having functionality that could be included in PDA module 210 include devices that operate PALM OS software, manufactured by PALM INC., or POCKET PC software manufactured by MICROSOFT INC.

A PDA housing segment 215 includes an exterior panel 212. The PDA module may be activated when exterior panel 212 is detected to be in an upward position. For example, exterior panel 212 of PDA module 210 may be upward facing in FIGS. 1A and 1B, when the electronic device 100 is in the first state. The first housing segment 215 contains internal components for operating the PDA module 210. Under an example provided by FIG. 2A, internal components of the PDA module 210 are described with FIG. 8.

The PDA module 210 provides a set of user-interface features on exterior panel 212. The set of user-interface features include a display 222, and a set of buttons 224. Display 222 may be activated to provide digital user-interface features, such as graphical icons and buttons. The PDA module may also include a handwriting recognizer 228. The handwriting recognizer 228 may be either virtual, so as to occur by activation of display 222, or fixed as a separate component of display 222.

Other components of PDA module 210 include a radio-frequency transmitter 232 or antenna for wireless communications. Other types of communication ports (not shown) include BlueTooth enabled ports, or infrared ports.

If the electronic device 100 is oriented so that PDA module 210 is selected, user-interface features of PDA module 210 are operational. Display 222 may display content. Contact with display 222 may cause input to be entered. The buttons 224 may be pressed to cause electronic device 100 to perform predefined actions. The digital buttons 226 and handwriting recognizer 228 may appear on display 222, or otherwise be provided on front panel 212 to prompt the user for input. If the electronic device is oriented so that the PDA module 210 is not selected, then buttons 224 cannot be pressed to enter input. Contact with display 222 will also not enter input. Display 222 may not provide content.

In an embodiment, when PDA module 210 is not selected (i.e. oriented to be downward facing), then PDA module 210 is maintained in a low-power state, where incidental contact with user-interface features of the module does not cause input to be entered into the electronic device. The low-power state may also affect internal components of the electronic device used to operate the PDA module 210. For example, a processor used by the PDA module may be switched to maintain minimal operations until an interrupt is received that corresponds to the electronic device changing orientation.

FIG. 2B is a frontal view of a phone module 220, for use as second module 120 (FIGS. 1A and 1B). The phone module 220 may be operated to make mobile phone calls, or establish wireless network communications for the electronic device.

A phone housing segment 225 includes an exterior panel 232. The set of user-interface features for the phone module 220 include a display 240, and a button set comprising a plurality of buttons 242. The buttons 242 may form a number pad. The phone module 220 may be activated when the exterior panel 232 is detected to be in the upward position.

If the phone module 220 is not selected by the orientation of the electronic device 100, the set of user-interface features for the phone module 220 are not operational. This may correspond to buttons 242 not being actuatable to enter input. Display 240 may also not display any content. In one embodiment, phone module 220 is maintained in a low power state when not selected. This may limit some or all internal functions of phone module 220. For example, when phone module 220 is in the low-power state, a processor that operates phone module 220 may be operated at a low-power state where minimal operations are performed.

When the phone module 220 is selected, the user-interface features of the phone module are made operational. This may correspond to display 240 displaying content. The buttons 242 may be pressed to signal input to the processor, or to make the display 240 display information corresponding to the button press.

While FIGS. 2A and 2B discuss modules of electronic device 100 as being switched to a low-power state, other embodiments may provide that only select components of the module or deactivated. For example, if PDA module 210 is selected to be inactive by the orientation of the electronic device, then only display 222 and buttons 224 are made inactive. An internal processor or memory of the PDA module 210 may be maintained in an active state, and possibly shared with phone module 220. Still further, the radio-frequency transmitter 232 may continue to receive wireless communications.

D. Selection Mechanism for Electronic Device

In one embodiment, the inactive module is placed in a low-power state, while the other module is made active. In another embodiment, only certain features of one module are made inactive, while features of the other module are maintained in an active state.

Figure 3:
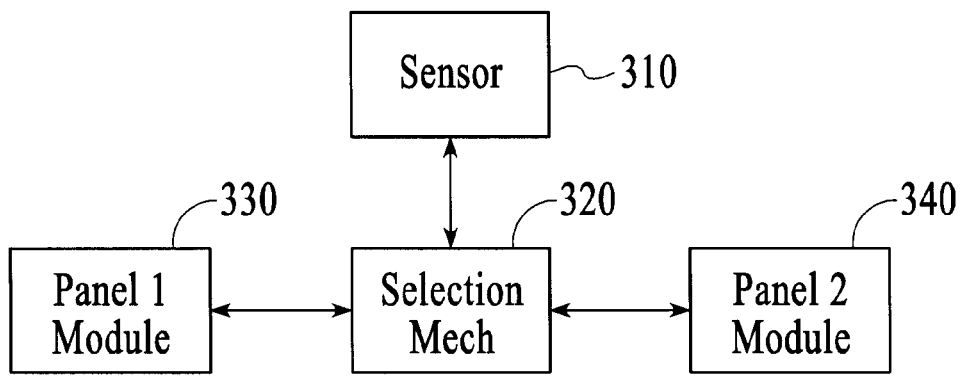
FIG. 3 is a block diagram of an embodiment of the invention.

FIG. 3 is a simplistic block diagram of another embodiment of the invention. An electronic device 300 includes a sensor 310, a selection mechanism 320, a first module 330, and a second module 340. The sensor 310 detects the orientation of the electronic device 300. The selection mechanism 320 selects one of the modules to be operational based on the orientation detected by sensor 310. The module that is not selected may be switched into or maintained in a lower-power state. The selected module may be switched into or maintained in an active state.

If a change in the orientation of the electronic device 300 is detected, the newly selected module becomes active. The previously selected module 320 becomes inactive.

According to an embodiment, sensor 310 is a device that provides orientation information to the processor or other selection mechanism 320. In one embodiment, sensor 310 may be an electromechanical device configured to determine the orientation of the electronic device 100 from physical properties, such as balance, weight, gravity, light and/or other environmental factors. In another embodiment, sensor 310 is a sensor that detects aspects about the user's contact. Fro example, sensor 310 may detect where the users fingers are so as to orient the electronic device 100 towards the user's body. In one embodiment, sensor 310 may detect gravitational forces so as to provide orientation information regarding which of the two modules is upward facing. For example, as shown with FIGS. 1A and 1B, the orientation may be designated so that the upward facing module is the module selected to be operational. Specific examples of sensor 310 include a gyroscope or an accelerometer.

In an embodiment, selection mechanism 320 is a processor that receives orientation information from sensor 310. The processor executes instructions to determine the orientation of the electronic device 300 based on the orientation information. The processor may also execute instructions to activate and/or deactivate one of the modules 330, 340 based on the orientation determined from the sensor's orientation information. In an embodiment such as shown by FIG. 3, the instructions executed by the processor would be to switch or maintain one of the modules into a low-power state while switching or maintaining the other module in the active state.

Figure 4:
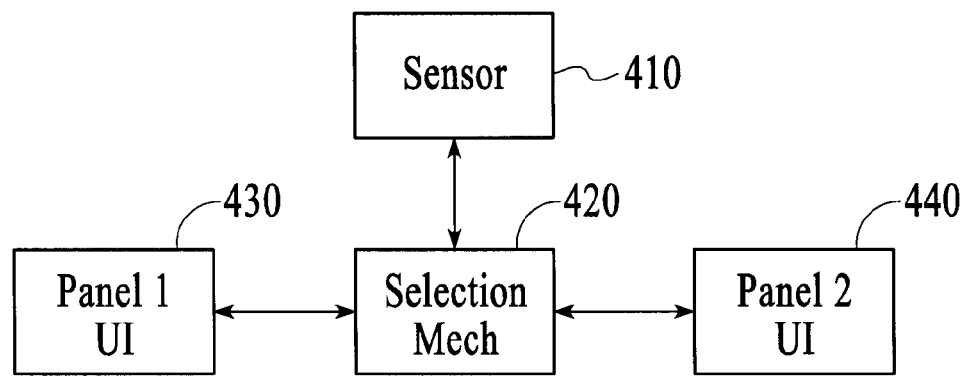
FIG. 4 is a block diagram of another embodiment of the invention.

FIG. 4 is simplistic block diagram of an embodiment of the invention. An electronic device 400 includes a sensor 410, a selection mechanism 420, a first set of user-interface features 430 on a first panel, and a second set of user-interface features 440 on a second panel. The sensor 410 detects the orientation of the electronic device 400.

According to embodiment such as shown with FIG. 4, selection mechanism 420 deactivates or otherwise incapacitates some or all of the user-interface features on one of the modules, while enabling or otherwise maintaining the user-interface features of the other modules as operational. The selection mechanism 420 elects which set of user-interface features to activate in response to the detected orientation.

In an embodiment, selection mechanism 420 selects one of the two sets of user-interface features based on orientation information received from sensor 410. For example, if the module containing the first set of user-interface features 430 is detected to be upward facing, then the first set of user-interface features 430 are made to be active by the selection mechanism 420. Concurrently, the second set of user-interface features 440 is selected to be inactive.

The modules providing each of the first and second sets of user-interface features 430 and 440 may share components or have internal components that are concurrently active regardless of the orientation of the electronic device. One set of user-interface features may be disabled because of the electronic device's orientation, but internal components of the electronic device 400 may be maintained operation in order to operate the active user-interface features.

An embodiment such as shown with FIG. 4 makes it possible for electronic device 400 to share a component such as a processor amongst two modules. The selection of one module over the other module would inactivate buttons or other user-interface features on one module, but the processor would remain active regardless of the orientation of the electronic device.

In this way, a user may operate an electronic device without concern for making contact with the other set of user-interface features by accident. Furthermore, the electronic device 100 may share components more readily between modules.

For example, with reference to FIGS. 2A and 2B, PDA module 210 and phone module 220 may share components that include a processor, a memory, a battery, and an analog-digital converter. Shared components may be used to operate the active module or set of user-interface features.

E. Method for Selecting a Module Based on Device Orientation

Figure 5:
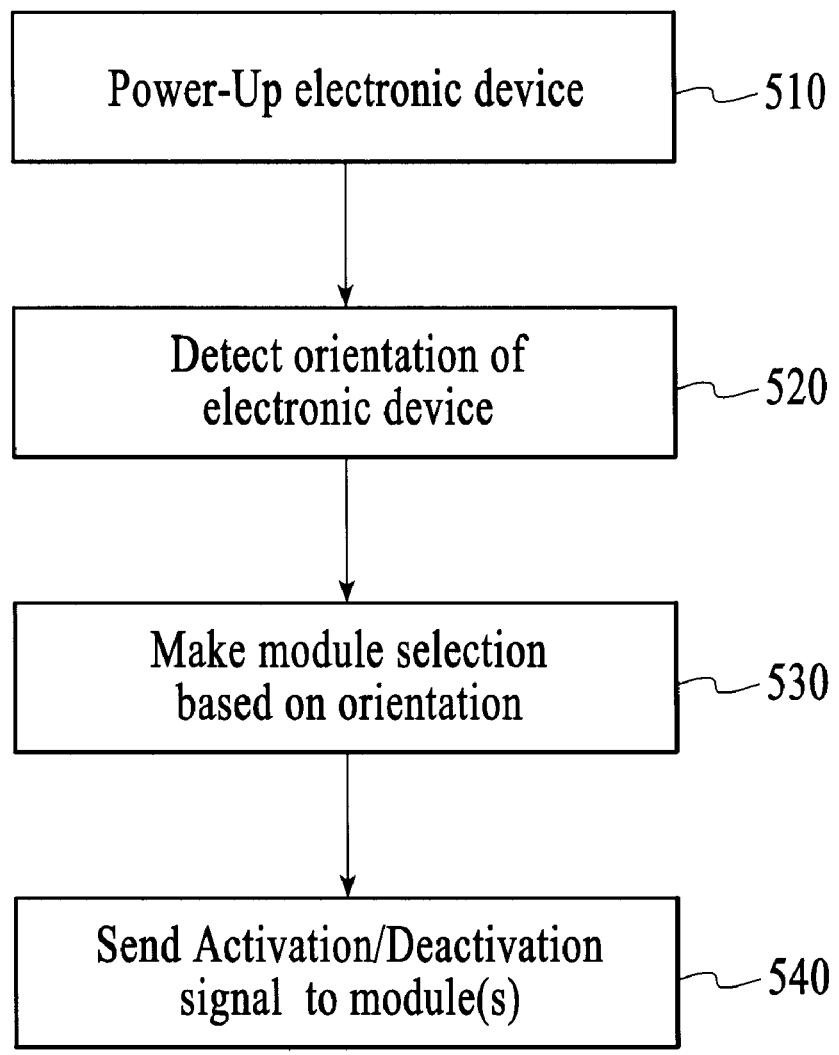
FIG. 5 is a method for operating an electronic device from a low-power state, under an embodiment of the invention.
Figure 6:
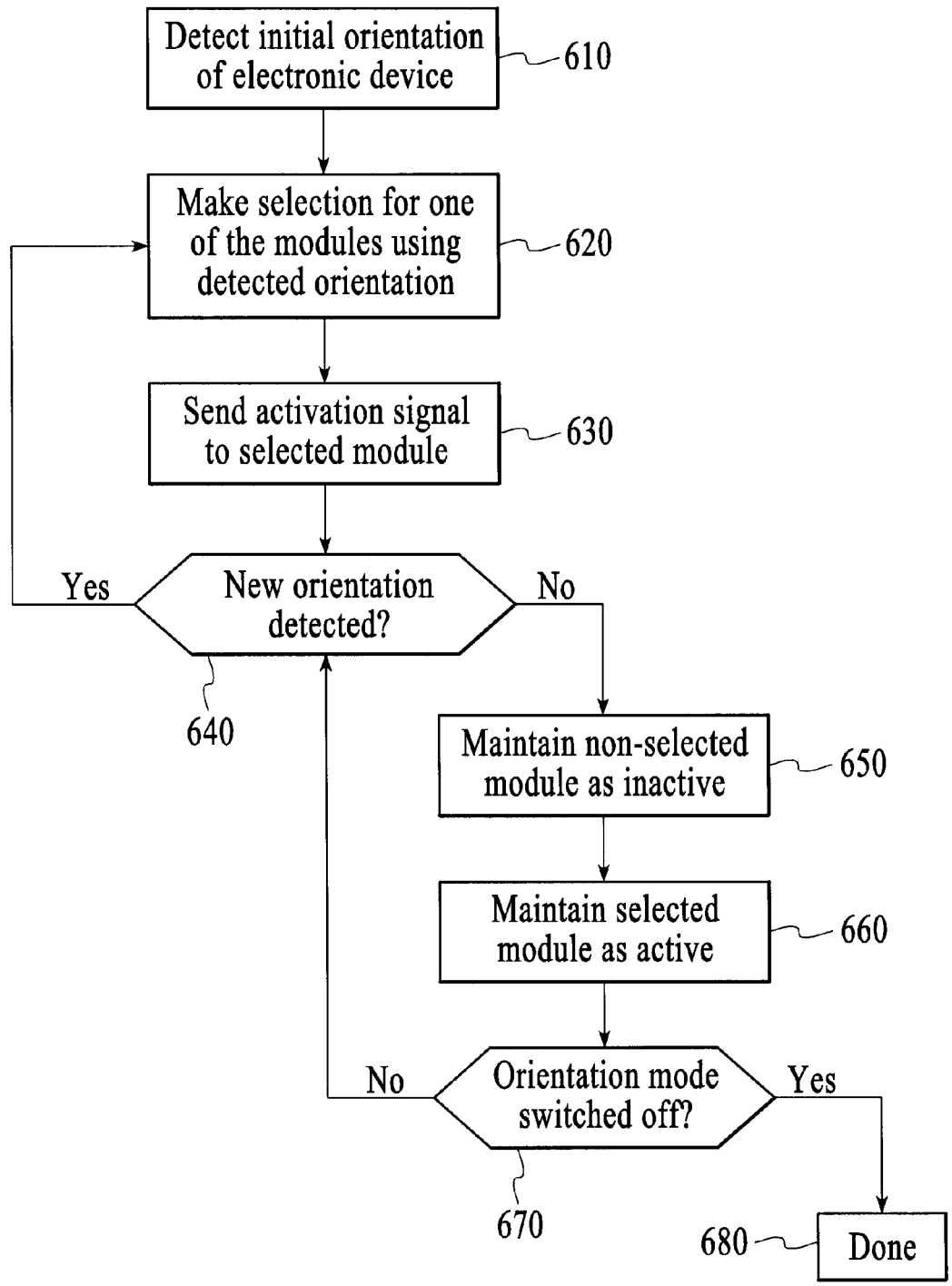
FIG. 6 is a method for operating an electronic device in multiple orientations, under an embodiment of the invention.

FIGS. 5 and 6 describe embodiments where an electronic device is operated based on its detected orientation. Reference to numerals of other figures in this section is intended to illustrate exemplary components for practicing embodiments detailed in FIGS. 5 and 6. Reference to numerals in FIGS. 1A and 1B are made for illustrative purposes only.

FIG. 5 is a method for operating electronic device 100 (FIG. 1) beginning from when the orientation of the device is irrelevant. This may correspond to the electronic device 100 being off, in sleep-mode, or other low-power state. This may also correspond to the electronic device being in a mode where it is operational, but not orientation dependent.

In step 510, the electronic device 100 is switched to a state where the orientation is relevant. The electronic device 100 may be powered on, or switched from one operational mode into another operational mode that is orientation dependent.

Step 520 provides that the orientation of the electronic device 100 is detected. This may correspond to identifying which housing segments 115, 125 have exterior panels that are facing upward, and/or facing downward.

Step 530 provides that a selection is made for one of the two (or more) modules. The selection is dependent on the orientation detected for the electronic device 100. For example, FIGS. 1A and 1B illustrate selections made based on which module 110, 120 is upward facing.

In step 540, the selected module is sent an activation signal. In one embodiment, the selection may also (or in the alternative) be made by sending the non-selected module an inactivation signal. The activation signal may switch one of the two modules into an operational power state. The deactivation signal may cause one of the modules to be switched into or maintained in a low-power state.

In other embodiments, the activation or deactivation signals cause user-interface features of the selected or non-selected module 110, 120 to be activated or deactivated. For example, the non-selected module may be sent a deactivation signal that deactivates the user-interface features of that module.

FIG. 6 is a method for operating an electronic device in multiple orientations, under an embodiment of the invention.

In step 610, an initial orientation of the electronic device 100 is detected. The initial orientation may correspond to immediately after the electronic device 100 is powered on, or alternately to when the electronic device is switched into an orientation dependent mode. For example, one of the modules may correspond to a handheld computer, such as a PALM type electronic organizer. Another of the modules may correspond to an accessory device for the handheld computer. The accessory device may be detachably coupled to the handheld computer. When the handheld computer is operated by itself, its orientation does not matter. It is only when the accessory device is coupled to the handheld computer that the combined devices can be used according to their detected orientation. In this example, the handheld computer enters a mode where its detected orientation matters after it is attached to the accessory device.

In step 620, a selection is made for one of the modules based on the orientation that is initially detected. In the example of the handheld computer and the accessory device, the selection may be made based on whether the front panel of the handheld computer or the back panel of the accessory device is facing upwards.

Step 630 provides that an activation signal is sent to the selected module. Other embodiments may provide a deactivation signal that is sent to the non-selected module. The deactivation signal may be sent in conjunction with or as an alternative to the activation signal. In either case, one module is active, and the other module is inactive.

In step 640, a determination is made as to whether a new orientation is detected for the electronic device 100.

If in step 640 the determination is that the new orientation is detected, then steps 620 and 630 are repeated using the new detected orientation in stead of the previous orientation.

If in step 640 the determination is that no new orientation is detected, then step 650 provides that the inactivity of the non-selected module is maintained. No change to the non-selected module is made. In one embodiment, this step may correspond to the user-interface features of the non-elected module being maintained in a disabled state. In another embodiment, this step may correspond to the entire non-selected module being maintained inactive, or in a low-power state.

Step 660 provides that the selected module is maintained in an active state. This may correspond to the selected module being fully operational and active.

In step 670, a determination is made as to whether the electronic device 100 is to be maintained in an orientation dependent mode. For example, the electronic device may be switched off. Alternatively, the electronic device may be switched into a mode where it can be operated without affects from its orientation. For example, where two modules are detachably coupled to one another, this may also correspond to one module being decoupled from the other module.

If the determination is that the mode for selecting the orientation is switched on, then the method is repeated, starting with step 640. Else, the method is done in step 680.

F. Housing Configuration for PDA and Accessory Device

Figure 7:
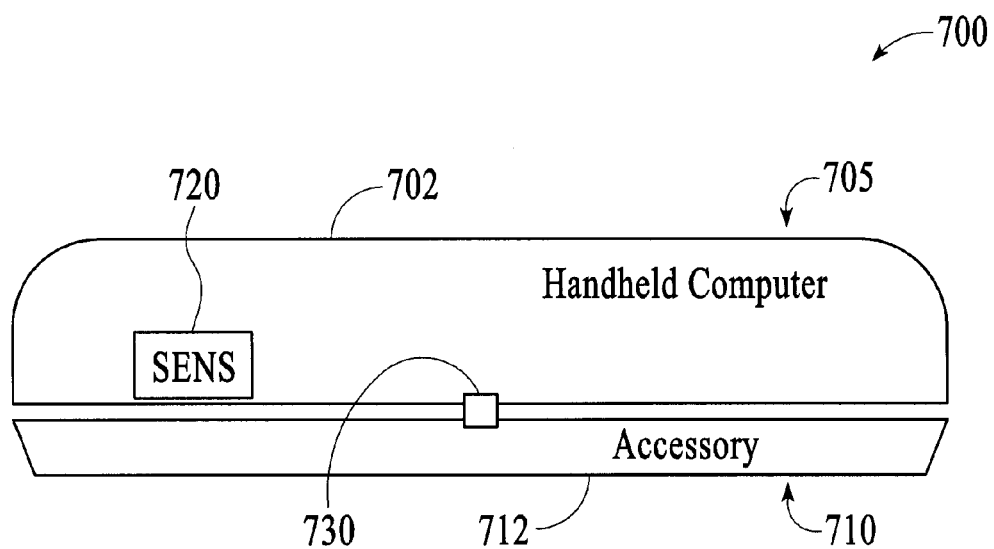
FIG. 7 is a side view of a handheld computer detachably coupled to an accessory device, under an embodiment of the invention.

FIG. 7 is a side view of a handheld computer and accessory device forming an electronic device, under an embodiment of the invention. According to an embodiment, handheld computer 705 (typically referred to as a "PDA") is detachably coupled to an accessory device 710 to form an electronic device 700. A sensor 720 device may be incorporated into the handheld computer 710 and/or accessory device in order to detect the orientation of the electronic device. A coupling mechanism 730 detachably couples the accessory device 710 to the handheld computer 705. A front panel 702 of the handheld computer 705 and a back panel 712 of the accessory device 710 form the exterior panels of the combined devices. The coupling mechanism 730 may, for example, comprise a spring-loaded connector mechanism that can be biased to couple two device together, and to release two devices from one another.

The term "detachably coupled" means one device can be connected to or detached from the other device using a coupling mechanism that can be operated by a user without need for a tool. For example, the user may press one or more buttons, or move a lever in order to detach one device from the other. Detachably connected does not mean use of fasteners that require tools, such as screws.

In one application, if handheld computer 705 is detected to be upward, then handheld computer 705 has active user-interface features (such as buttons and display) on exterior panel 702. If the handheld computer 705 is detected to be downward facing, then accessory device 710 has active user-interface features on exterior panel 712. In the latter orientation, handheld computer 705 (or its user-interface features) may be inactive. Likewise, when the accessory device is detected to be downward, the accessory device 710 or its set of user-interface features my be designated as inactive.

For example, one module may comprise a handheld computer, such as a PALM ORGANIZER manufactured by Palm, Inc. Another module may comprise an accessory device for that handheld computer. Examples of accessory devices for handheld computers include phone modules, modems, wireless receivers, and global positioning systems.

Examples of detachable coupling mechanisms for connecting handheld computers and accessory devices are provided in the following issued patents, all of which are hereby incorporated by reference. Other examples of detachable coupling mechanisms and arrangements between handheld computers and accessory devices are provided in the following patent applications, all of which are hereby incorporated by reference.

G. Hardware Components

Figure 8:
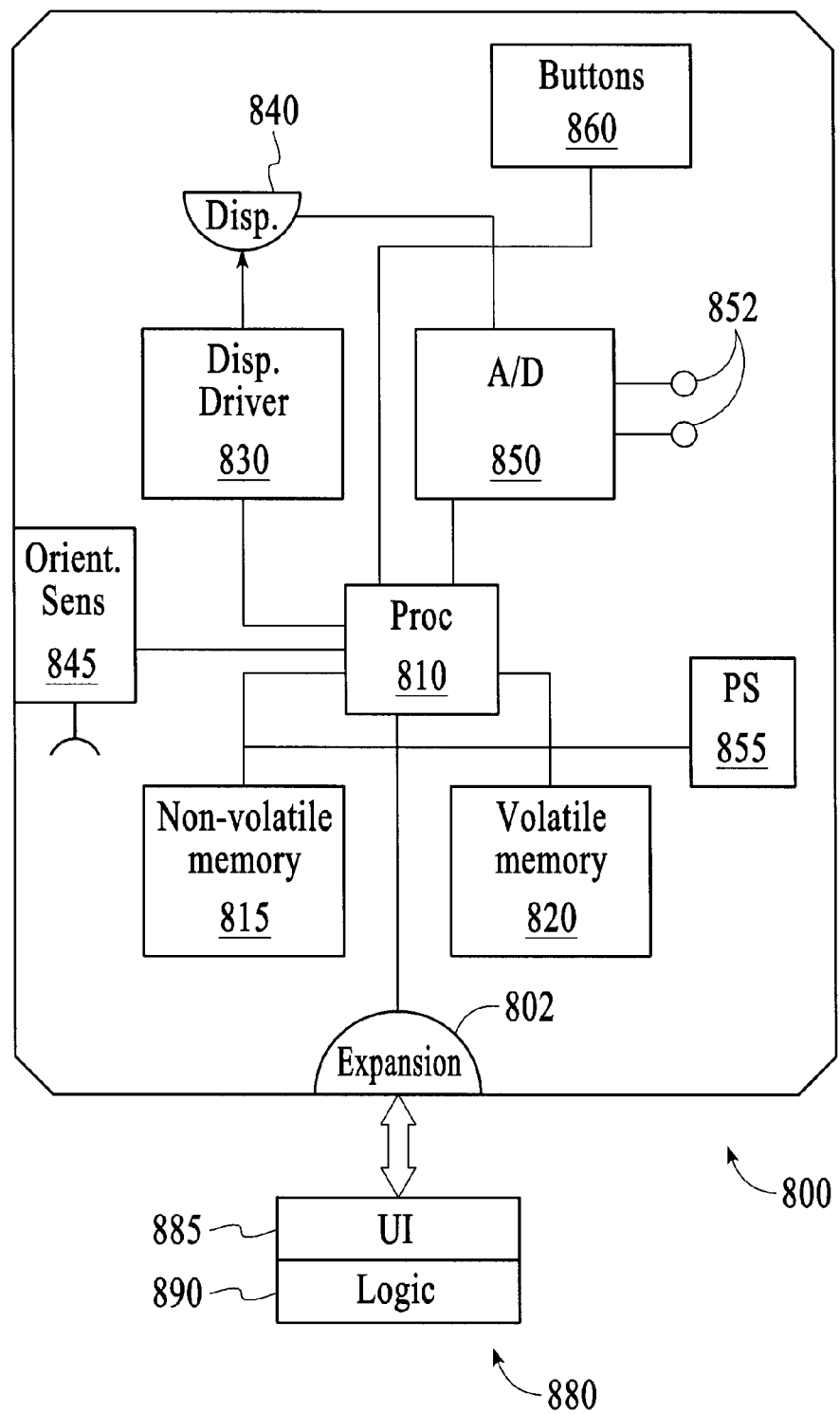
FIG. 8 is a block diagram illustrating internal components of a handheld computer for use with an embodiment of the invention.

FIG. 8 is a block diagram illustrating a hardware implementation for use with an embodiment where an electronic device that is formed by the combination of a handheld computer 800 and an accessory device 880. The accessory device 880 may detachably couple to the handheld computer 800, in a manner described with FIG. 7.

In an embodiment, handheld computer 800 includes a processor 810 connected to a first memory 815 (non-volatile) and to a second memory 820 (volatile). A display driver 830 connects to processor 810. The display driver 830 and processor 810 combine to output content onto a display 840. Display 840 may be contact-sensitive. An analog-digital converter 850 is connected to processor 810. The analog-digital converter 850 may convert contact with display 840 into input. The analog-digital converter 850 may have multiple channels 852, including one for interpreting contact with display 840. A power source 855, such as a battery, may provide power to all of the components of the handheld computer 800. The power source 855 may also be used to power the accessory device 880. A set of buttons 860 or other actuatable surfaces may operate off processor 810.

The accessory device 880 may connect to processor 810 via expansion port 802. In one embodiment, accessory device 880 has a set of user-interface features 885 that can be operated from an exterior panel of the accessory device. Examples of user-interface features include a set of buttons or actuatable surfaces, or a display. The accessory device 880 may also include logic 890 that incorporates some functionality. The logic 890 may perform specific tasks in combination with processor 810 or other components of handheld computer 800.

An orientation sensor 845 may be located on handheld computer 800. The orientation sensor 845 may be connected to processor 810. The orientation sensor 845 detects the orientation of the handheld computer 800, and signals orientation information to processor 810. The processor 810 is configured to select either handheld computer 800 or accessory device 880 as being active. The active device will have full use of its component. The device not selected will have limited or no use of its component.

For example, if the orientation information causes processor 810 to select handheld computer 800 to be active, then all facilities of accessory device 880 may be switched off. If the orientation information causes processor 810 to select accessory device 880 to be active, then display 840 and/or the set of buttons 860 may be disabled. Other components of handheld computer 800 may be needed when handheld computer 800 is inactive, such as processor 810 or power source 850.

As an alternative, the logic 890 may operate independently of components in handheld computer 800. In one embodiment, logic 890 may be a combination of circuitry, processor and/or memory for performing accessorial functions in combination with handheld computer 800.

For example, accessory device 880 may be a wireless communication device that uses internal components of handheld computer 800 to make wireless, radio-frequency communications. For some uses, the wireless communications provided by the accessory device 880 may utilize processor 810 or memory components 815 and 820. The accessory device 880 may for example, be a mobile phone that uses components of handheld computer 800 to record verbal messages made on the accessory device 880.

H. Alternative Embodiments

Many embodiments described herein detail electronic device 100 as having only two modules, where one module is selected to be active or have more active features. Other embodiments may provide more modules. Furthermore, more than one module may be made active or inactive.

While embodiments described with FIGS. 3 and 4 describe a selection mechanism that also implement the selection, other embodiments may decouple the selection mechanism from the component that actually implements the selection. For example, in one embodiment, a processor may receive orientation information from the sensor, and based on the determined orientation, make a selection to activate the display of one of the two modules. A display driver may then activate a display on the selected module, and inactivate the display on the non-selected module.

Embodiments described with FIG. 5 detail the electronic device as powering up so as to select one or the other of two modules. It is also possible for the electronic device to be operated in a mode where both modules are operational concurrently. The user at some point may elect to make the electronic device operate one module over the other based on the overall orientation of the electronic device.

Embodiments described with FIG. 7 illustrate a handheld computer detachably coupled to an accessory device. Other embodiments may provide for one handheld computer having two sets of user-interface features or functionality. One set of-user-interface features may appear on one exterior panel of the handheld computer. Another set of user-interface features may appear on another exterior panel of the handheld computer. The sensor detects the orientation to select one set of user-interface features over another set of user-interface features.

While embodiments described herein contemplate a processor as a selection mechanism, other embodiments may use other types of components. For example, the selection mechanism may be a simple switch, such as on a multiplexer. Other embodiments provide for a display driver to be used as the selection mechanism. The actual selection of one of the modules to be active may be made by either an intelligent component, such as a processor, or by a device such as a switch that is activated by orientation information.

I. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An electronic device comprising:
   a housing having first and second housing segments;
   a first module contained in the first housing segment, wherein the first module includes one or more user-interface features provided with the first housing segment;
   a second module contained in the second housing segment, wherein the second module includes one or more user-interface features provided with the second housing segment for use with the second module and not the first module;
   a sensor to detect an orientation of the electronic device;
   a selection mechanism to automatically select at least one, but not all, of the plurality of modules to be active, based on the detected orientation of the electronic device; and
   wherein the one or more user-interface features of each of the first module and the second module includes at least one component to provide output to a user and one component to enable the user to enter input.

2. The electronic device of claim 1, wherein at least one of the user-interface features of each of the first and second modules is at least partially controllable by the selection mechanism, and wherein the selection mechanism enables the at least one of the user-interface features of the at least one selected module to be operational.

3. The electronic device of claim 1, wherein the first housing segment has a first exterior panel that provides of the one or more user-interface features of the first module, and the second housing segment has a second exterior panel that provides the one or more user-interface features of the second module, and wherein the selection mechanism selects one of the user-interface features of the first module or the second module to be operational.

4. The electronic device of claim 3, wherein the first exterior panel opposes the second exterior panel.

5. The electronic device of claim 3, wherein the sensor determines whether the first exterior panel or the second exterior panel is positioned downward.

6. The electronic device of claim 5, wherein the sensor detects a direction of gravity.

7. The electronic device of claim 6, wherein the sensor is an accelerometer.

8. The electronic device of claim 3, wherein the first housing segment is detachably coupled to the second housing segment.

9. The electronic device of claim 3, wherein the one or more user-interface features of the first module includes a display and a plurality of actuatable surfaces.

10. The electronic device of claim 9, wherein the one or more user-interface features of the second module includes a display and a plurality of actuatable surfaces.

11. The electronic device of claim 1, wherein the selection mechanism is a processor configured to enable each of the modules individually.

12. The electronic device of claim 1, wherein the selection mechanism detects a new orientation, and selects a different module in response to the detected new orientation.

13. An electronic device comprising:
    a first module having a combination of logic and one or more user-interface features;
    a second module having a combination of logic and one or more user-interface features coupled to the first module; and
    an orientation detection mechanism to select one of the first and second modules for activation according to an orientation of the electronic device;
    wherein at least one of said first and second modules is configured to engage in at least one form of wireless communication; and
    wherein the one or more user-interface features of each of the first module and the second module includes at least one component to provide output to a user and one component to enable the user to enter input.

14. The electronic device of claim 13, wherein the orientation detection mechanism includes a sensor that detects the orientation.

15. The electronic device of claim 14, wherein the orientation detection mechanism includes a processor that activates the selected module.

16. The electronic device of claim 14, wherein the orientation detection mechanism includes a processor that deactivates the selected module.

17. An electronic device comprising:
    a housing having a first surface and a second surface;
    a first set of user-interface features provided on the first surface;
    a second set of user-interface features provided on the second surface;
    a detection mechanism to detect an orientation of the electronic device;
    a selection mechanism to automatically select one of the first or second set of user-interface features to be active, based on the detected orientation of the electronic device; and
    a common component that can be functionally engaged by the first set of user-interface features when they are active, and by the second set of user-interface features when they are active; and
    wherein each of the first set and second set of user-interface features includes at least one component to provide output to a user and one component to enable the user to enter input.

18. The electronic device of claim 17, wherein the first set of user-interface features and the second set of user-interface features each include one or more user-interface features selected from the group consisting of a display, a button, a contact-sensitive display, pre-programmed input mechanisms appearing on the contact sensitive display, a speaker, and a microphone.

19. The electronic device of claim 17, wherein the selection mechanism is a component selected from a group of components consisting of a processor, a display driver, and a switch.

20. The electronic device of claim 17, wherein the detection mechanism is a sensor capable of detecting gravity.

21. The electronic device of claim 17, wherein the first surface is on a first panel, and wherein the second surface is on a second panel that opposes the first panel.

22. The electronic device of claim 1, wherein the first housing segment is detachably coupled to the second housing segment.

23. The electronic device of claim 1, wherein the first module is configured to operate in an alternative mode wherein the first and second modules are operational concurrently.

24. The electronic device according to claim 13, wherein the at least one form of wireless communication is selected from a group of wireless communication activities consisting of global positioning system activity, cellular telephone activity, modem activity, wireless receiver activity, and combinations thereof.

25. The electronic device according to claim 24, wherein the cellular telephone activity includes at least one of cellular voice mode, text messaging, e-mail accessing, and web browsing.

26. The electronic device according to claim 17 wherein the common component is a processor.

* * * * *